United States Patent
Lee et al.

(10) Patent No.: US 9,632,797 B2
(45) Date of Patent: Apr. 25, 2017

(54) UPDATING A COMMIT LIST TO INDICATE DATA TO BE WRITTEN TO A FIRMWARE INTERFACE VARIABLE REPOSITORY

(71) Applicant: Hewlett-Packard Development Company, L.P., Houston, TX (US)

(72) Inventors: Terry Ping-Chung Lee, Antelope, CA (US); Thanh Minh Pham, Elk Grove, CA (US); Derek Schumacher, Auburn, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/764,144

(22) PCT Filed: Jan. 31, 2013

(86) PCT No.: PCT/US2013/023979
§ 371 (c)(1),
(2) Date: Jul. 28, 2015

(87) PCT Pub. No.: WO2014/120169
PCT Pub. Date: Aug. 7, 2014

(65) Prior Publication Data
US 2015/0363208 A1 Dec. 17, 2015

(51) Int. Cl.
*G06F 12/08* (2016.01)
*G06F 21/57* (2013.01)
(Continued)

(52) U.S. Cl.
CPC .............. *G06F 9/441* (2013.01); *G06F 8/665* (2013.01); *G06F 9/4403* (2013.01);
(Continued)

(58) Field of Classification Search
CPC ............ G06F 12/0246; G06F 12/0882; G06F 12/0875; G06F 8/665; G06F 21/572
See application file for complete search history.

(56) References Cited

U.S. PATENT DOCUMENTS

| 7,403,987 B1 | 7/2008 | Marinelli |
| 7,512,719 B1 | 3/2009 | Gillespie |

(Continued)

OTHER PUBLICATIONS

Intel Corp., "Intel® Server Boards S3200SH/S3210SH," Technical Product Specification, May 20, 2010, http://download.intel.com/support/motherboards/server/s3200sh/sb/e14960009_s3201sh_tps_r1_89.pdf.
(Continued)

*Primary Examiner* — Aracelis Ruiz
(74) *Attorney, Agent, or Firm* — Hewlett Packard Enterprise Patent Department (57) ABSTRACT

Examples disclosed herein relate to updating a commit list to indicate data to be written to a firmware interface (FI) variable repository. Examples include storing target data in a variable repository cache of system management memory of a computing device during a given SMM event, updating a commit list, during the given SMM event, to indicate that the target data is to be written to the FI variable repository, and ending the given SMM event without at least some portion of the target data being written to the FI variable repository during the given SMM event.

15 Claims, 4 Drawing Sheets

(51) Int. Cl.

| | | |
|---|---|---|
| *G06F 12/02* | (2006.01) | |
| *G06F 9/445* | (2006.01) | |
| *G06F 9/44* | (2006.01) | |
| *G06F 12/0875* | (2016.01) | |
| *G06F 12/14* | (2006.01) | |
| *G06F 12/0882* | (2016.01) | |
| *G06F 21/74* | (2013.01) | |

(52) U.S. Cl.
CPC ...... *G06F 12/0246* (2013.01); *G06F 12/0875* (2013.01); *G06F 12/0882* (2013.01); *G06F 12/1433* (2013.01); *G06F 21/572* (2013.01); *G06F 21/74* (2013.01); *G06F 2212/452* (2013.01); *G06F 2212/603* (2013.01); *G06F 2212/7201* (2013.01)

(56) References Cited

U.S. PATENT DOCUMENTS

| | | |
|---|---|---|
| 7,925,876 B2 | 4/2011 | Lee |
| 8,255,594 B2 | 8/2012 | De et al. |
| 8,321,499 B2 | 11/2012 | Reisman |
| 2004/0118758 A1 | 6/2004 | Gordon-Ingram |
| 2005/0033777 A1 | 2/2005 | Moraes et al. |
| 2006/0242402 A1 | 10/2006 | Swift et al. |
| 2008/0040524 A1 | 2/2008 | Zimmer et al. |
| 2010/0017796 A1* | 1/2010 | Walker ............... G06F 9/4411 717/174 |
| 2010/0169967 A1 | 7/2010 | Khosravi et al. |
| 2010/0186452 A1 | 7/2010 | Harjunen et al. |
| 2010/0198332 A1 | 8/2010 | Gerold |
| 2010/0217968 A1 | 8/2010 | Estroff et al. |
| 2010/0218178 A1 | 8/2010 | Sakai |
| 2011/0044087 A1 | 2/2011 | Shiga et al. |
| 2011/0072254 A1 | 3/2011 | Kuang et al. |
| 2011/0082832 A1 | 4/2011 | Vadali et al. |
| 2012/0059180 A1 | 3/2012 | Dueppen et al. |
| 2012/0062948 A1 | 3/2012 | Nishikawa |
| 2012/0260082 A1 | 10/2012 | Bobzin |

OTHER PUBLICATIONS

PCT/ISA/KR, International Search Report and Written Opinion, PCT/US2013/023979, mailed on Jul. 30, 2013, 9 pps.

* cited by examiner

UPDATING A COMMIT LIST TO INDICATE DATA TO BE WRITTEN TO A FIRMWARE INTERFACE VARIABLE REPOSITORY

BACKGROUND

A computing device may protect information from tampering by storing the information in a portion of memory that is accessible in a system management mode (SMM) of the computing device. For example, a computing device may implement a firmware interface (FI) variable repository in such a portion of memory to protect the repository from tampering. In such examples, storing data in the FI variable repository may include triggering a system management interrupt (SMI) to cause the computing device to enter the SMM, in which the data may be written to the repository.

BRIEF DESCRIPTION OF THE DRAWINGS

The following detailed description references the drawings, wherein.

DETAILED DESCRIPTION

As noted above, a computing device may implement a firmware interface (FI) variable repository in a portion of memory that is accessible in a system management mode (SMM) of the computing device. In such examples, the computing device may access the FI variable repository during SMM events. As used herein, an "SMM event" of a computing device is a period in which the computing device is in the SMM. In such examples, to write to the FI variable repository, the computing device may trigger an SMM event by issuing a system management interrupt (SMI) to cause the computing device to enter SMM. During the SMM event, the computing device may write data to the FI variable repository, which may be implemented in (e.g., stored in) a non-volatile memory device of the computing device.

However, writing the data to the non-volatile memory device during the SMM event may cause the computing device to remain in SMM for an unacceptably long amount of time. For example, the amount of time spent in SMM may be too long if the non-volatile memory device is relatively slow, the computing device's access to the non-volatile memory device is relatively slow, the amount of data to be stored is relatively large, or a combination thereof. Remaining in SMM for too long may negatively impact the operation of the computing device, possibly leading to erratic behavior of an operating system (OS) of the computing device, or even causing the OS to crash, for example.

To address these issues, examples described herein may, in response to a request to write target data to a firmware interface (FI) variable repository via SMM, store the target data in a variable repository cache of system management memory of a computing device during a given SMM event, update a commit list of the system management memory during the given SMM event to indicate that the target data is to be written to the FI variable repository, and end the given SMM event after the commit list has been updated and without at least some portion of the target data being written to the FI variable repository during the given SMM event. In examples described herein, data indicated in the commit list may be written to the FI variable repository during supplemental SMM event(s) after the given SMM event in which the commit list was updated.

In this manner, examples described herein may exit SMM without waiting for all of the target data to be written to a FI variable repository implemented in non-volatile memory of the computing device. Accordingly, examples described herein may limit the amount of time spent in SMM in response to a request to write data to the FI variable repository. In some examples, the system management memory access time may be similar to that of main memory of the computing device, and accordingly may be much faster than the access time for the FI variable repository implemented in non-volatile memory of the computing device. Moreover, in some examples described herein, the length of each supplemental SMM event may be limited to prevent the computing device from remaining in the SMM for too long during such SMM events.

Figure 1:
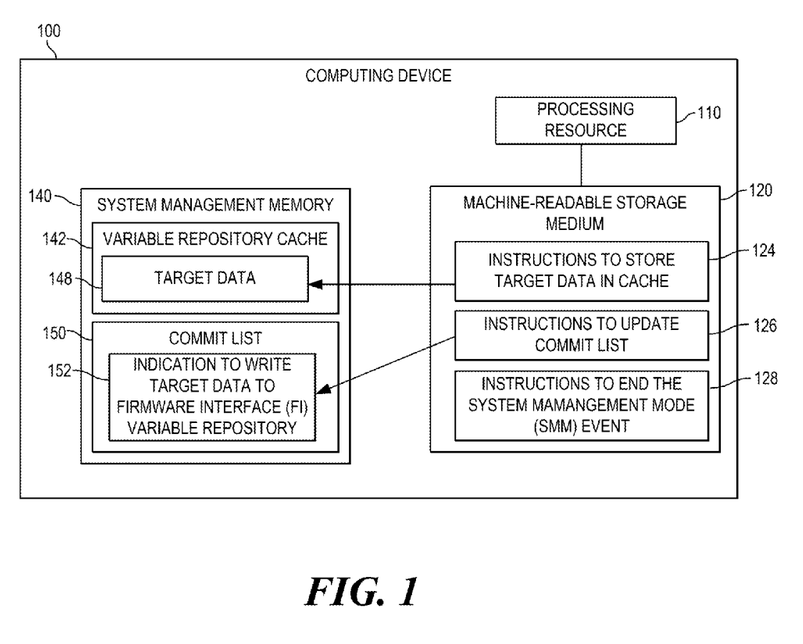
FIG. 1 is a block diagram of an example computing device to update a commit list to indicate that data is to be written to a firmware interface (FI) variable repository.

Referring now to the drawings, FIG. 1 is a block diagram of an example computing device 100 to update a commit list to indicate that data is to be written to a firmware interface (FI) variable repository. As used herein, a "computing device" may be a server (e.g., a rack mount server, a stand-alone server, at least one blade server, a blade enclosure comprising at least one blade server, a partition of a blade enclosure where the partition includes at least one blade server, etc.), workstation, desktop computer, notebook computer, tablet computer, mobile phone, smart device, or any other processing device or equipment. In the example of FIG. 1, computing device 100 includes a processing resource 110 and a machine-readable storage medium 120 encoded with instructions 124, 126, and 128. In some examples, storage medium 120 may include additional instructions. In some examples, instructions 124, 126, 128, and any other instructions described herein in relation to storage medium 120 may be stored on a machine-readable storage medium remote from but accessible to computing device 100 and processing resource 110.

In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to implement the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard disk), any type of storage disc (e.g., a Compact Disc Read Only Memory (CD-ROM), any other type of compact disc, a DVD, etc.), and the like, or a combination thereof. Further, any machine-readable storage medium described herein may be non-transitory.

Computing device 100 also includes system management memory 140. In some examples, system management memory 140 may be RAM, such as system management RAM (SMRAM). In some examples, the system management memory 140 may be a portion of main memory of computing device 100. In such examples, the portion of main memory forming system management memory 140 may be accessible to computing device 100 in SMM and inaccessible to any OS of computing device 100. In some examples, the main memory may be implemented by at least one memory device of computing device 100. In other examples, system management memory 140 may be any machine-readable storage medium.

In the example of FIG. 1, in response to a request to write target data 148 to the FI variable repository via SMM, instructions 124 may store target data 148 in a variable repository cache 142 during a given SMM event. Variable repository cache 142 may be stored in system management memory 140. In examples described herein, a system management mode (SMM) may be a mode in which a computing device may operate while any OS of the computing device is suspended, and in which a resource of the computing device (or a portion of the resource) that is inaccessible to the OS is accessible to the computing device. For example, a particular portion of a resource (e.g., a particular portion of a memory device) may inaccessible to an OS of the computing device, but accessible to components of the computing device running firmware of the computing device when the computing device is in SMM. In examples described herein, a resource of a computing device may be any component (e.g., memory device, machine-readable storage medium, processing resource, etc.) or functionality of the computing device. In some examples, system management memory 140 (e.g., SMRAM) may be inaccessible to an OS of computing device 100 but accessible to computing device 100 in SMM. In examples described herein, a resource of a computing device (or a portion of the resource) that is accessible in SMM but "inaccessible" to an OS may be a resource or portion of a resource that is not accessible to the OS independent of the SMM. Also, in some examples described herein, a resource of a computing device (or a portion thereof) inaccessible to an OS and accessible to the computing device during SMM may also be accessible to the computing device during a boot process to boot an OS of the computing device before control is handed to the OS.

In some examples, the request to write target data 148 to the FI variable repository via SMM may be a call, by the OS or firmware of computing device 100, to a service that may invoke SMM to write data to the FI variable repository. In such examples, in response to the call (either directly or indirectly), instructions 124 may store target data 148 in variable repository cache 142 during the given SMM event.

In some examples, the service may be, for example, a "SetVariable" service available to at least one of an OS and firmware of computing device 100. In some examples, in response to the call to the service, computing device 100 may trigger an SMI, which may cause computing device 100 to enter SMM thereby beginning the given SMM event in which instructions 124 may store target data 148 in variable repository cache 142. In examples described herein, "firmware" may be instructions stored on at least one machine readable storage medium and executable by a processing resource of a computing device.

In the example of FIG. 1, variable repository cache 142 may be a stored in system management memory 140, and may be maintained as a system management memory 140 copy of the FI variable repository. In some examples, the FI variable repository may be implemented in non-volatile memory of computing device 100. In such examples, the FI variable repository may be implemented in a non-volatile memory device of computing device 100 that is separate from a memory device including system management memory 140. In some examples, data may be written to variable repository cache 142 prior to being written to the FI variable repository.

In examples described herein, the FI variable repository may be a variable repository of a firmware interface of a computing device. In examples described herein, a firmware interface of a computing device may include a set of executable instructions to provide an interface between firmware of the computing device and an OS of the computing device. In some examples, the firmware interface may comprise an interface in accordance with the Unified Extensible Firmware Interface (UEFI) specification, an interface in accordance with the Extensible Firmware Interface (EFI) specification, a basic input/output system (BIOS), or the like, or a combination thereof.

In examples described herein, the FI variable repository may be a repository to store data for an OS and firmware of a computing device. In such examples, the OS or firmware may write to the FI variable repository via SMM by calling a service such as the SetVariable service, as described above. In such examples, either the OS or the firmware may use the SetVariable service to write variables to the FI variable repository to be read back later via SMM, or during boot time of the computing device. For example, the OS may use the SetVariable service to write data to the FI variable repository so that the data is available to the computing device the next time the system boots the OS to thereby affect the behavior of the computing device is some manner.

In the example of FIG. 1, a commit list 150 may be stored in system management memory 140. Commit list 150 may be a list of data that is to be written to the FI variable repository. In some examples, in response to the request to write target data 148 to the FI variable repository via SMM, instructions 126 may, during the given SMM event, update commit list 150 to indicate that target data 148 is to be written to the FI variable repository. For example, instructions 126 may update commit list 150 by writing, to commit list 150, an indication 152 that target data 148 is to be written to the FI variable repository. For example, instructions 126 may write target data 148 to commit list 150 as the indication 152. In other examples, instructions 126 may write, to commit list 150, a reference to target data 148 as the indication 152. In such examples, the reference may include at least a location at which target data 148 is stored in variable repository cache 142 and the size of target data 148.

In some examples, instructions 128 may end the given SMM event by exiting the SMM after commit list 150 has been updated by instructions 126, and without at least some portion of target data 148 being written to the FI variable repository during the given SMM event. For example, instructions 128 may exit SMM, and thereby end the given SMM event, without any of target data 148 being written to the FI variable repository during the given SMM event. In such examples, instructions 128 may end the given SMM event after instructions 126 have updated commit list 150 to indicate that target data 148 is to be written to the FI variable repository, and before any of target data 148 is written to the FI variable repository. In other examples, instructions 128 may end the given SMM event after a first portion of target data 148 is written to the FI variable repository during the given SMM event and before a second portion of target data 148 is written to the FI variable repository. In such examples, instructions 128 may end the given SMM event before all of target data 148 is written to the FI variable repository. In examples described herein, ending an SMM event includes exiting SMM. In some examples, data indicated in commit list 150 after ending the given SMM event may be written to the FI variable repository during supplemental SMM event(s) after the given SMM event in which commit list 150 was updated. In examples described herein, a supplemental SMM event may be an SMM event that occurs after a given SMM event during which a commit list is updated to indicate data to be written to a FI variable repository.

In some examples, instructions 124, 126, and 128 may be part of an installation package that, when installed, may be executed by processing resource 110 to implement the functionalities described herein in relation to instructions 124, 126, and 128. In such examples, storage medium 120 may be a portable medium, such as a CD, DVD, or flash drive, or a memory maintained by a server from which the installation package can be downloaded and installed. In other examples, instructions 124, 126, and 128 may be part of an application, applications, or component already installed on computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-5.

Figure 2:
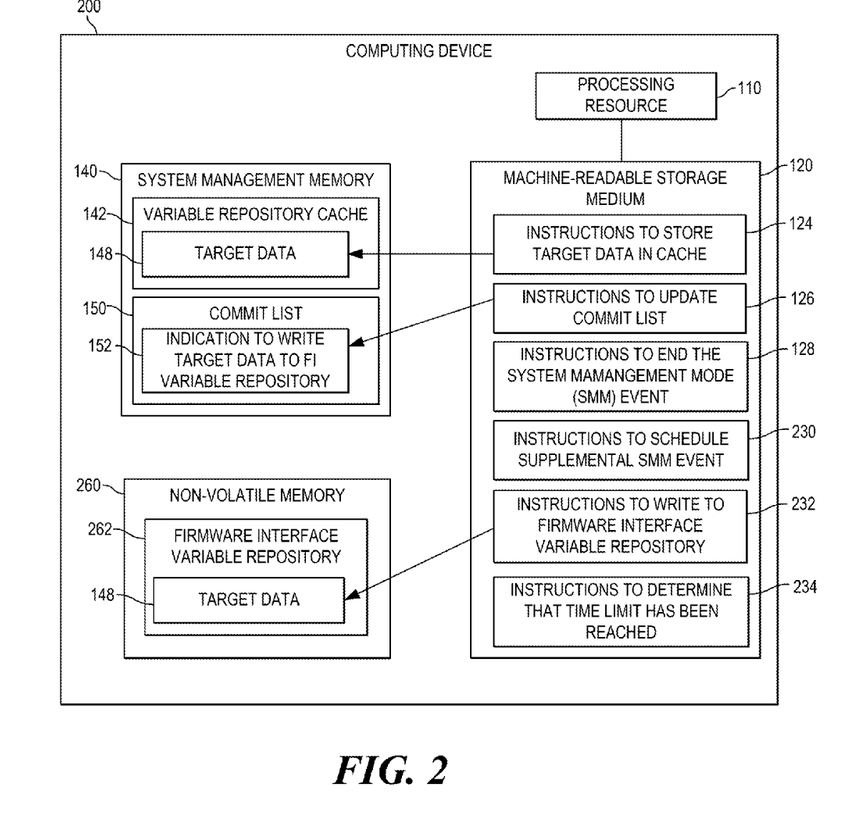
FIG. 2 is a block diagram of an example computing device to write data indicated in the commit list to the FI variable repository.

FIG. 2 is a block diagram of an example computing device 200 to write data indicated in commit list 150 to a FI variable repository. In the example of FIG. 2, computing device 200 includes a processing resource 110, as described above in relation to FIG. 1, and a storage medium 120 including instructions 124, 126, and 128, as described above in relation to FIG. 1. In the example of FIG. 2, storage medium 120 may also include instructions 230, 232, and 234. In some examples, storage medium 120 may include additional instructions. In other examples, instructions 124, 126, 128, 230, 232, 234 and any other instructions described herein in relation to storage medium 120 may be stored on a machine-readable storage medium remote from but accessible to computing device 100 and processing resource 110. Computing device 200 also includes a variable repository cache 140 and a commit list 150, stored in a system management memory 140, as described above in relation to FIG. 1. In the example of FIG. 2, computing device 200 also includes an FI variable repository 262 implemented in (e.g., stored in) non-volatile memory 260 of computing device 200.

In the example of FIG. 2, in response to a request to write target data 148 to the FI variable repository via SMM, instructions 124 may store target data 148 in variable repository cache 142 of system management memory 140 during a given SMM event, as described above in relation to FIG. 1. Also in response to the request, instructions 126 may, during the given SMM event, update commit list 150 to indicate that target data 148 is to be written to the FI variable repository as described above in relation to FIG. 1. For example, instructions 126 may write an indication 152 to commit list 150, as described above.

In some examples, instructions 230 may, during the given SMM event, schedule at least one supplemental SMM event. For example, instructions 230 may schedule a supplemental SMM event to occur at some point after the given SMM event has ended and an OS of computing device 200 has regained control of computing device 200. In other examples, instructions 230 may configure computing device 200 to begin triggering periodic supplemental SMM events. In some examples, instructions 230 may schedule individual or periodic SMM events by writing to appropriate physical register(s), configuring appropriate settings in memory to be utilized by executable instructions of computing device 200, or in any other suitable manner.

Instructions 128 may end the given SMM event by exiting the SMM after commit list 150 has been updated by instructions 126, and without at least some portion of target data 148 being written to the FI variable repository during the given SMM event. In some examples, instructions 128 may end the given SMM event after instructions 230 schedule at least one supplemental SMM event. In some examples, during each of the supplemental SMM event(s), instructions 232 may write a respective portion of any data indicated in commit list 150 to FI variable repository 262. In other examples, instructions 232 may write a respective portion of any data indicated in commit list 150 to FI variable repository 262 during each of at least some of the supplemental SMM event(s). In such examples, instructions 232 may not write any of the data indicated in commit list 150 to FI variable repository 262 during some of the supplemental SMM event(s). In examples described herein, instructions 232 may write data to FI variable repository 262, or may cause other component(s) of computing device 200, other executable instruction(s) (e.g., a driver) of computing device 200, or the like, to write data to FI variable repository 262.

In some examples, during each of at least one supplemental SMM event after the given SMM event, instructions 232 may check commit list 150 for any indication(s) of data that is to be written to FI variable repository. For example, during a supplemental SMM event after the given SMM event, instructions 232 may check commit list 150 and identify an indication 152 that target data 148 remains to be written to FI variable repository 262. In such examples, instructions 232 may write at least a portion of target data 148, indicated in commit list 150, to FI variable repository 262 during the supplemental SMM event. In other examples, instructions 232 may write respective portions of the target data indicated in commit list 150 to FI variable repository 262 during respective supplemental SMM events of a plurality of supplemental SMM events. In such examples, the plurality of supplemental SMM events in which data is written to FI variable repository 262 may not be consecutive supplemental SMM events. For example, supplemental SMM event(s) in which no data is written to FI variable repository 262 may occur between supplemental SMM event(s) of the plurality in which data is written to FI variable repository 262, before the plurality of supplemental SMM events in which data is written, or a combination thereof.

In some examples, the duration of each of the supplemental SMM event(s) is limited. In such examples, during each of the supplemental SMM event(s), instructions 234 may determine whether an SMM time limit has been reached during the supplemental SMM event. In examples described herein, the value of the SMM time limit may be configurable. In some examples, the length of the SMM time limit may be approximately 100 ms, or any other suitable amount of time.

As noted above, in some examples, instructions 232 may write at least a portion of target data 148, indicated in commit list 150, to FI variable repository 262 during a supplemental SMM event. In some examples, the size of target data 148 (or a portion thereof) indicated in commit list 150 as remaining to be written is too large to write to FI variable repository 262 in the supplemental SMM event. In such examples, during the supplemental SMM event, instructions 234 may determine that the SMM time limit has been reached during the supplemental SMM event before all of the indicated target data 148 has been written to FI variable repository 262. In response to the determination, instructions 128 may end the supplemental SMM event. In such examples, instructions 128 may end the supplemental SMM event regardless of whether any data is indicated in commit list 150 as remaining to be written to the FI variable repository.

In such examples, after determining that the SMM time limit has been reached and prior to instructions 128 ending the supplemental SMM event, instructions 126 may update commit list 150 to indicate what portion of the data indicated in commit list 150 at the beginning of the supplemental SMM event remains to be written to the FI variable repository 262 after the supplemental SMM event. In such examples, when the supplemental SMM event ends, commit list 150 may indicate the data that remains to be written to FI variable repository 262 after the supplemental SMM event.

In some examples, if commit list 150 indicates that data remains to be written to FI variable repository 262 after the supplemental SMM event and computing device 200 is not currently configured to trigger periodic SMM events, then instructions 230 may schedule another supplemental SMM event before instructions 128 end the supplemental SMM event. In such examples, the additional SMM event may be used to continue writing the data to FI variable repository 262. If computing device 200 is currently configured to periodically trigger supplemental SMM events, then additional SMM event(s) to continue writing to FI variable repository 262 will be triggered without further scheduling. In other examples, if no data remains to be written to the FI variable repository 262 after the supplemental SMM event, and instructions 230 previously configured computing device 200 to trigger supplemental SMM events periodically, then before ending the current supplemental SMM event, instructions 230 may configure computing device 200 to cease the periodic triggering of supplemental SMM events.

In some examples, during each supplemental SMM event, instructions 232 may write whatever amount of any data indicated in commit list 150 may be written before instructions 234 detect that the SMM time limit has been reached. In such examples, instructions 232 may write the data indicated in commit list 150 to FI variable repository 262 in the order specified in commit list 150, and beginning at the point in the data at which a writing operation of a previous SMM event (if any) left off. In such examples, if a first portion of target data 148 is written to FI variable repository 262 during an SMM event, instructions 232 may write the rest (or a next portion) of target data 148 to FI variable repository 262 during a supplemental SMM event.

In some examples, instructions 124, 126, 128, 230, 232, 234 and any other instructions of storage medium 120 may be part of an installation package that, when installed, may be executed by processing resource 110 to implement the functionalities described herein in relation to instructions 124, 126, 128, 230, 232, and 234. In such examples, storage medium 120 may be a portable medium, such as a CD, DVD, or flash drive, or a memory maintained by a server from which the installation package can be downloaded and installed. In other examples, instructions 124, 126, 128, 230, 232, and 234 may be part of an application, applications, or component already installed on computing device 100 including processing resource 110. In such examples, the storage medium 120 may include memory such as a hard drive, solid state drive, or the like. In some examples, functionalities described herein in relation to FIG. 2 may be provided in combination with functionalities described herein in relation to any of FIGS. 1 and 3-5.

Figure 3:
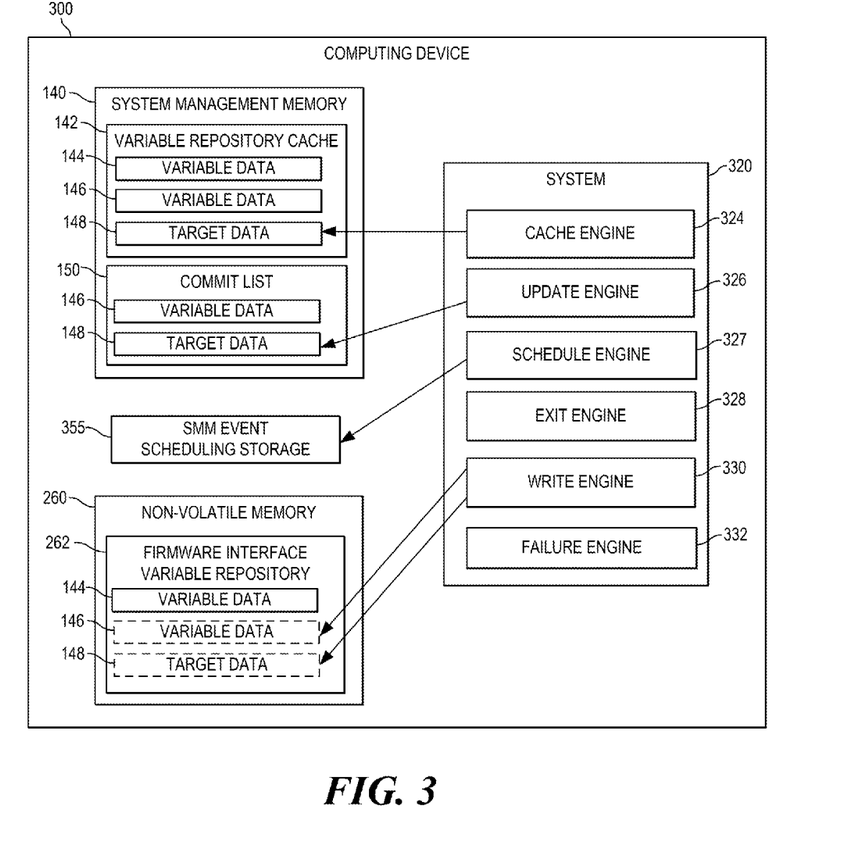
FIG. 3 is a block diagram of an example computing device including a system to write data indicated in a commit list to a FI variable repository during at least one supplemental system management mode (SMM) event.

FIG. 3 is a block diagram of an example computing device 300 including a system 320 to write data indicated in a commit list to a FI variable repository during at least one supplemental SMM event. In the example of FIG. 3, computing device 300 comprises a system management memory 140, as described above in relation to FIG. 1. Computing device 300 also includes a variable repository cache 142 and a commit list 150, as described above in relation to FIG. 1, each stored in system management memory 140. Computing device 300 also includes an FI variable repository 262 implemented in non-volatile memory 260, as described above in relation to FIG. 2.

In the example of FIG. 3, system 320 includes engines 324, 326, 327, 328, 330, and 332. In some examples, system 320 may include additional engines. Each of engines 324, 326, 327, 328, 330, 332, and any other engines of system 320, may be any combination of hardware and programming to implement the functionalities of the respective engine. Such combinations of hardware and programming may be implemented in a number of different ways. For example, the programming may be processor executable instructions stored on a non-transitory machine-readable storage medium and the hardware may include a processing resource to execute those instructions. In such examples, the machine-readable storage medium may store instructions that, when executed by the processing resource, implement system 320. The machine-readable storage medium storing the instructions may be integrated in the same computing device as the processing resource to execute the instructions, or the machine-readable storage medium may be separate but accessible to the computing device and the processing resource. The processing resource may one processor or multiple processors included in a single computing device or distributed across multiple computing devices.

In some examples, the instructions can be part of an installation package that, when installed, can be executed by the processing resource to implement system 320. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on a computing device including the processing resource. In such examples, the machine-readable storage medium may include memory such as a hard drive, solid state drive, or the like.

In the example of FIG. 3, in response to a request to write target data 148 to an FI variable repository 262 via SMM, a cache engine 324 may store target data 148 in variable repository cache 142 of system management memory 140 of computing device 300 during a given SMM event, as described above in relation to instructions 124 of FIG. 1. In some examples, the request to write target data 148 to the FI variable repository via SMM may be a call, by the OS or firmware of computing device 100, to a service that may invoke SMM to write data to the FI variable repository, as described above in relation to FIG. 1. In such examples, in response to the call to the service, computing device 100 may trigger an SMI, which may cause computing device 100 to enter SMM and thereby begin the given SMM event in which engine 324 may store target data 148 in variable repository cache 142, as described above in relation to instructions 124 of FIG. 1.

In the example illustrated in FIG. 3, the request to store target data 148 to FI variable repository 262 may follow prior requests to store variable data 144 and 146, respectively, to FI variable repository 262. In such examples, in response to the prior requests, cache engine 324 may store variable data 144 and 146 in variable repository cache 142 during respective SMM events, as described above in relation to target data 148. In such examples, variable data 144 and 146 may already be stored in variable repository cache 142 when cache engine 324 stores target data 148 to variable repository cache 142 during the given SMM event, as illustrated in FIG. 3.

Also in response to the request to write target data 148 to an FI variable repository via SMM, during the given SMM event, update engine 326 may update commit list 150 to indicate that target data 148 is to be written to FI variable repository 262, as described above in relation to FIG. 1. As noted above, commit list 150 may be a list of data that is to be written to FI variable repository 262. In the example of FIG. 3, in response to the prior requests to store variable data 144 and 146, update engine 326 may, during respective SMM events, update commit list 150 to indicate that each of variable data 144 and 146 is to be written to FI variable repository 262. For example, variable data 144 and 146 may each be written to commit list 150.

In the example of FIG. 3, the given SMM event may occur after variable data 144 has been written to FI variable repository 262 and commit list 150 has been updated to remove the indication that variable data 144 remains to be written to FI variable repository 262. In such examples, when update engine 326 updates commit list 150 to indicate that target data 148 is to be written to FI variable repository 262, commit list 150 may still indicate that variable data 146 is to be written to FI variable repository 262, as illustrated in FIG. 3.

In some examples, update engine 326 is to specify, in commit list 150, an order in which the data was requested to be written to FI variable repository 262. In such examples, the order specified in commit list 150 may also be the order in which the data is to be written to FI variable repository 262. In this manner, examples described herein may write data to the FI variable repository 262 in the order in which the data was requested to be written to the FI variable repository 262. Update engine 326 may specify the order in the commit list in any suitable manner. For example, data or references to data may be stored in commit list 150 in the order in which the data was requested to be written to FI variable repository 262.

In the example of FIG. 3, schedule engine 327 may, during the given SMM event, schedule at least one supplemental SMM event. In such examples, scheduling supplemental SMM event(s) may cause computing device 300 to enter SMM again after the given SMM event. In some examples, during the given SMM event, engine 327 may schedule one supplemental SMM event. In such examples, engine 327 may configure computing device 300 to enter SMM once after the given SMM event has ended and an OS of computing device 300 has resumed operation. In such examples, during each supplemental SMM event, if data remains to be written to FI variable repository 262 after the supplemental SMM event, engine 327 may schedule another supplemental SMM event in which write engine 330 may continue writing to FI variable repository 262. In other examples, during the given SMM event, engine 327 may schedule at least one supplemental SMM event by configuring computing device 300 to periodically enter SMM.

In some examples, engine 327 may schedule supplemental SMM event(s), as described above in relation to FIG. 1, in response to updating commit list 150 to indicate that target data 148 is to be written to FI variable repository 262. For example, engine 327 may schedule supplemental SMM event(s) by writing appropriate configuration data to SMM event scheduling storage 355 of computing device 300. In some examples, storage 355 may be physical register(s) of computing device 300, region(s) of memory utilized by executable instructions of computing device 300, or the like. In other examples, engine 327 may schedule supplemental SMM event(s) in any other suitable manner.

In some examples, in response to commit list 150 being updated from an empty state to indicate data to be written to FI variable repository 262, engine 327 may configure computing device 300 to periodically trigger a supplemental SMM event (e.g., by periodically triggering an SMI to enter SMM). In examples described herein, an empty state of commit list 150 may be a state in which the commit list does not indicate any data that is to be written to FI variable repository 262. As an example, if commit list 150 were empty prior to the given SMM event and, during the given SMM event, engine 326 updating commit list 150 to indicate that target data 148 is to be written to FI variable repository 262, then in response engine 327 may configure computing device 300 to periodically trigger supplemental SMM event(s).

In such examples, schedule engine 327 may further configure computing device 300 to cease the periodic triggering of supplemental SMM event(s) in response to a determination that commit list 150 does not indicate any data that remains to be written to the FI variable repository. For example, if the writing of target data 148 indicated in commit list 150 is completed during one of the supplemental SMM event(s), write engine may determine that commit list 150 does not indicate any further data to be written to FI variable repository 262. In response, schedule engine 327 may configure computing device 300 to cease the periodic triggering of supplemental SMM event(s).

In the example of FIG. 3, exit engine 328 may end the given SMM event by exiting SMM after commit list 150 has been updated and without at least some portion of target data 148 being written to FI variable repository 262 during the given SMM event, as described above in relation to instructions 128 of FIG. 1. Also, in some examples, schedule engine 327 may schedule the at least one supplemental SMM event prior to engine 328 ending the given SMM event.

In some examples, each of the supplemental SMM events may have a limited duration. In such examples, for each of the supplemental SMM event(s), exit engine 328 may end the supplemental SMM event in response to reaching an SMM time limit during the supplemental SMM event. For example, during each of the supplemental SMM event(s), write engine 330 may determine whether the SMM limit has been reached. In response to reaching the SMM time limit, engine 328 may end the supplemental SMM event regardless of whether any data is indicated in commit list 150 as remaining to be written to FI variable repository 262. In such examples, after determining that the SMM time limit has been reached, and before engine 328 ends the supplemental SMM event, engine 326 may update commit list 150 to indicate what portion of the data indicated in commit list 150 at the beginning of the supplemental SMM event remains to be written to FI variable repository 262 after the supplemental SMM event.

In the example of FIG. 3, write engine 330 may write a respective portion of any data indicated in commit list 150 to FI variable repository 262 during each of at least one supplemental SMM event of limited duration. In examples described herein, a supplemental SMM event of limited duration may be a supplemental SMM event whose duration is limited by the SMM time limit and exit engine 328, as described above. In such examples, during each of the supplemental SMM event(s), write engine 330 may write to FI variable repository 262 at least a portion of any data indicated in commit list 150. The amount of data that engine 330 writes to FI variable repository 262 during an SMM event may depend upon the length of the SMM time limit. For example, during a supplemental SMM event, engine 330 may write as much of the data indicated in commit list 150 as it is able to write before the SMM time limit is reached. In other examples, engine 330 may write a respective portion of any data indicated in commit list 150 to FI variable repository 262 during each of at least some of the supplemental SMM event(s). In such examples, engine 330 may not write any of the data indicated in commit list 150 to FI variable repository 262 during some of the supplemental SMM event(s). In examples described herein, write engine 330 may write data to FI variable repository 262, or may cause other component(s) of computing device 300, other executable instruction(s) (e.g., a driver) of computing device 300, or the like, to write data to FI variable repository 262.

Since each supplemental SMM event is of limited duration, a single supplemental SMM event may not be long enough to write all of the data indicated in commit list 150 to FI variable repository 262. In such examples, write engine 330 may write the data indicated in commit list 150 to FI variable repository 262 over the course of a plurality of supplemental SMM events. In such examples, write engine 330 may write a respective portion of the data indicated in commit list 150 to the FI variable repository 262 during each of at least some of the supplemental SMM events. In some examples, write engine 330 may not write any of the indicated data to FI variable repository 262 during at least one of the supplemental SMM events.

In some examples, write engine 330 is to write data indicated in commit list 150 to FI variable repository 262 in the order specified in commit list 150. In such examples, during respective supplemental SMM event(s), write engine 330 may write respective portions of the data indicated in commit list 150 to FI variable repository 262 such that the indicated data is written in the order specified in commit list 150. In the example illustrated in FIG. 3, for example, after engine 326 updates commit list 150 during the given SMM event to indicate that target data 148 is to be written to FI variable repository 262, commit list 150 may indicate that variable data 146 and target data 148 is to be written to FI variable repository 262, and may specify that variable data 146 was requested to be written before target data 148.

In such examples, write engine 330 may write respective portions of data 146 and 148 indicated in commit list 150 to FI variable repository 262 during respective supplemental SMM event(s) of limited duration. For example, write engine 330 may write variable data 146 and target data 148, in the order specified in commit list 150, to FI variable repository 262 during one supplemental SMM event, or over the course of a plurality of supplemental SMM events.

In the example of FIG. 3, system 320 further comprises a failure engine 332. In some examples, in response to the detection of a failure condition of computing device 300, failure engine 332 may trigger write engine 330 to write any data indicated in commit list 150 to FI variable repository 262. In some examples, the failure condition may be any condition indicating a failure of computing device 300 or some portion thereof (e.g., the OS of computing device 300). In some examples, the failure condition may be indicated by a system exception (e.g., a type of interrupt), a machine check, or the like. In the example of FIG. 3, in response to detection of a failure condition before writing data 146 and 148 to FI variable repository 262, engine 332 may cause write engine 330 to write data 146 and 148 to FI variable repository 262 prior to any reset of computing device 300. In this manner, examples described herein may prevent computing device 300 from losing data indicated commit list 150 as not yet written to FI variable repository 262 when a failure condition of computing device 300 occurs.

In other examples, failure engine 332 may cause write engine 330 to write any data indicated in commit list 150 to FI variable repository 262 during a boot process of computing device 300 performed in response to a failure condition of computing device 300. For example, in response to a failure condition of computing device 300, computing device 300 may be reset manually, or a reset may be triggered by detection of the failure condition. After the reset, computing device 300 may begin a boot process to boot an OS of computing device 300. In such examples, during the boot process, failure engine 332 may detect that commit list 150 indicates data to be written to FI variable repository 262. In response to detecting the data indicated in commit list 150, engine 332 may cause write engine 330 to write the data indicated in commit list 150 to FI variable repository 262 during the boot process. In such examples, commit list 150 is stored in an area of memory in which data is not lost when a reset of computing device 300 occurs. In some examples, variable repository cache 142 may also be stored in an area of memory in which data is not lost when a reset of computing device 300 occurs. Also, in such examples, FI variable repository 262 and system management memory 140 (including variable repository cache 142) may be accessible to components of computing device 300 during the boot process.

Although, in the example of FIG. 3, data 144, 146, and 148 is written to variable repository cache 142 and FI variable repository 262 in response to respective requests, in other examples, data may be written to cache 142 and variable repository 262 in response to any number of requests to write to FI variable repository 262. In some examples, functionalities described herein in relation to FIG. 3 may be provided in combination with functionalities described herein in relation to any of FIGS. 1-2 and 4-5.

Figure 4:
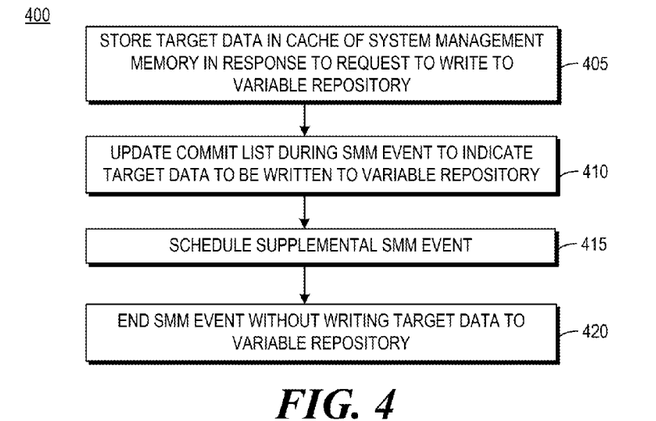
FIG. 4 is a flowchart of an example method for updating a commit list to indicate that data is to be written to a FI variable repository.

FIG. 4 is a flowchart of an example method 400 for updating a commit list to indicate that data is to be written to a FI variable repository. Although execution of method 400 is described below with reference to computing device 300 of FIG. 3, other suitable computing devices for execution of method 400 can be utilized (e.g., computing device 100 or 200). Additionally, implementation of method 400 is not limited to such examples.

At 405 of method 400, in response to a request to write target data 148 to a FI variable repository 262 via SMM, engine 324 may store target data 148 in variable repository cache 142 of system management memory 140 of computing device 300 during a given SMM event. At 410, update engine 326 may, during the given SMM event, update commit list 150 to indicate that target data 148 is to be written to FI variable repository 262. As described above, FI variable repository 262 may be implemented in non-volatile memory of computing device 300, and commit list 150 may be stored in system management memory 140.

At 415, schedule engine 327 may, during the given SMM event, schedule a supplemental SMM event, as described above. Schedule engine 327 may schedule the supplemental SMM event in response to the request to write target data 148 to FI variable repository 262 via SMM. In some examples, schedule engine 327 may schedule the supplemental SMM event by configuring computing device 300 to periodically trigger subsequent SMM event(s), wherein one of the subsequent SMM event(s) is the supplemental SMM event. In other examples, engine 327 may schedule one supplemental SMM event.

At 420, exit engine 328 may end the given SMM event after commit list 150 is updated and without target data 148 being written to FI variable repository 262 during the given SMM event. In such examples, exit engine 328 may end the given SMM event before any of target data 148 is written to FI variable repository 262, leaving target data 148 to be written to FI variable repository 262 during at least one supplemental SMM event.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5.

Figure 5:
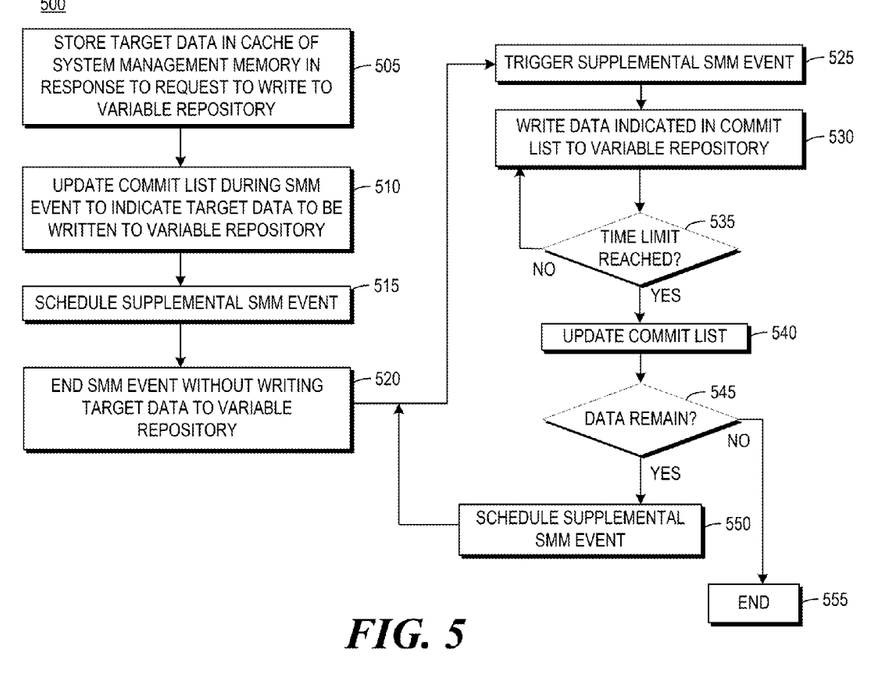
FIG. 5 is a flowchart of an example method for writing data indicated in a commit list to a FI variable repository during a supplemental SMM event.

FIG. 5 is a flowchart of an example method 500 for writing data indicated in a commit list to a FI variable repository during a supplemental SMM event. Although execution of method 500 is described below with reference to computing device 300 of FIG. 3, other suitable systems for execution of method 500 can be utilized (e.g., computing device 100 or 200). Additionally, implementation of method 500 is not limited to such examples.

At 505 of method 500, in response to a request to write target data 148 to a FI variable repository 262 via SMM, engine 324 may store target data 148 in variable repository cache 142 of system management memory 140 of computing device 300 during a given SMM event. At 510, update engine 326 may, during the given SMM event, update commit list 150 to indicate that target data 148 is to be written to FI variable repository 262. As described above, FI variable repository 262 may be implemented in non-volatile memory of computing device 300, and commit list 150 may be stored in system management memory 140.

At 515, schedule engine 327 may, during the given SMM event, schedule a supplemental SMM event, as described above. Schedule engine 327 may schedule the supplemental SMM event in response to the request to write target data 148 to FI variable repository 262 via SMM. At 520, exit engine 328 may end the given SMM event after commit list 150 is updated and without target data 148 being written to FI variable repository 262 during the given SMM event. In such examples, exit engine 328 may end the given SMM event before any of target data 148 is written to FI variable repository 262, leaving target data 148 to be written to FI variable repository 262 during at least one supplemental SMM event.

After the given SMM event is ended, computing device 300 may trigger the scheduled supplemental SMM event at 525. In some examples, computing device 300 may trigger an SMI to cause computing device 300 to enter SMM and thereby begin the supplemental SMM event at 525.

At 530, write engine 330 may write at least a portion of any data indicated in commit list 150 to FI variable repository 262 during the supplemental SMM event. For example, if commit list 150 indicates that a portion of variable data 146 and all of target data 148 are to be written to FI variable repository 262, then write engine 330 may write the indicated portion of variable data 146 to FI variable repository 262 during the supplemental SMM event. In some examples, data may not be written to FI variable repository 262 during some supplemental SMM event(s), as described above.

At 535, write engine 330 may determine whether the SMM time limit has been reached during the supplemental SMM event. If not, then write engine 330 may return to 530 to continue writing data indicated in commit list 150 to FI variable repository 262. If it is determined at 535 that the SMM time limit has been reached during the supplemental SMM event, then method 500 may proceed to 540.

At 540, in response to the determination that the SMM time limit has been reached during the supplemental SMM event, update engine 326 may update commit list 150 to indicate any data, indicated in commit list 150 before the supplemental SMM event, that remains to be written to FI variable repository 262 after the supplemental SMM event. For example, if write engine 330 wrote the portion of variable data 146 indicated in commit list 150 to FI variable repository 262 before reaching the SMM time limit, then at 540, update engine 326 may update commit list 150 to indicate that target data 148 remains to be written to FI variable repository 262 after the supplemental SMM event. For example, update engine 326 may remove the indication of the portion of variable data 146 from commit list 150.

At 545, schedule engine 327 may determine whether commit list 150 indicates that data remains to be written to FI variable repository 262 after the supplemental SMM event. If not, then method 500 may proceed to 555, where method 500 may end. If engine 327 determines at 545 that commit list 150 indicates that data remains to be written to FI variable repository 262 after the supplemental SMM event, then method 500 may proceed to 550.

At 550, in response to the determination that commit list 150 indicates that data remains to be written to FI variable repository 262 after the supplemental SMM event, engine 327 may, during the supplemental SMM event, schedule another supplemental SMM event. In such examples, at least a portion of target data 148 may be written to FI variable repository 262 during the additional supplemental SMM event. After scheduling another supplemental SMM event, method 500 may return to 525.

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 1-4.

What is claimed is:

1. A non-transitory machine-readable storage medium encoded with instructions executable by a processing resource of a computing device to:
in response to a request to write target data to a firmware interface (FI) variable repository via system management mode (SMM), store the target data in a variable repository cache of system management memory of the computing device during a given SMM event;
update, during the given SMM event, a commit list to indicate that the target data is to be written to the FI variable repository, implemented in non-volatile memory of the computing device, wherein the commit list is stored in the system management memory; and
end the given SMM event by exiting the SMM after the commit list has been updated and without at least some portion of the target data being written to the FI variable repository during the given SMM event.

2. The storage medium of claim 1, further comprising instructions to:
during the given SMM event, schedule a supplemental SMM event; and
during the supplemental SMM event, write at least a portion of the target data indicated in the commit list to the FI variable repository.

3. The storage medium of claim 2, further comprising instructions to:
determine that an SMM time limit has been reached during the supplemental SMM event;
wherein the instructions to end the SMM event further comprise instructions to end the supplemental SMM event, in response to the determination, regardless of whether any data is indicated in the commit list as remaining to be written to the FI variable repository.

4. The storage medium of claim 1, further comprising instructions to:
write respective portions of the target data indicated in the commit list to the FI variable repository during respective supplemental SMM events of a plurality of supplemental SMM events.

5. The storage medium of claim 1, wherein the instructions to update the commit list comprise instructions to write the target data to the commit list.

6. The storage medium of claim 1, wherein the instructions to update the commit list comprise instructions to write, to the commit list, a reference to the target data, the reference including at least a location at which the target data is stored in the variable repository cache.

7. A system comprising:
a cache engine to, in response to a request to write target data to a firmware interface (FI) variable repository via a system management mode (SMM), store the target data in a variable repository cache of system management memory of a computing device during a given SMM event;
an update engine to update, during the given SMM event, a commit list to indicate that the target data is to be written to the FI variable repository, implemented in non-volatile memory of the computing device, wherein the commit list is stored in the system management memory;
an exit engine to end the given SMM event by exiting the SMM after the commit list has been updated and without at least some portion of the target data being written to the FI variable repository during the given SMM event; and
a write engine to write a respective portion of any data indicated in the commit list to the FI variable repository during each of at least one supplemental SMM event of limited duration.

8. The system of claim 7, further comprising:
a schedule engine to schedule, during the given SMM event, one of the at least one supplemental SMM events.

9. The system of claim 7, further comprising:
a schedule engine to configure the computing device to periodically trigger a respective one of the at least one supplemental SMM event in response to the commit list being updated from an empty state to indicate data to be written to the FI variable repository;
wherein the schedule engine is further to configure the computing device to cease the periodic triggering of supplemental SMM events in response to a determination that the commit list does not indicate any data that remains to be written to the FI variable repository; and
wherein, for each of the at least one supplemental SMM events, the exit engine is to end the supplemental SMM event in response to reaching an SMM time limit during the supplemental SMM event.

10. The system of claim 7, wherein:
the update engine is to specify, in the commit list, an order in which any data indicated in the commit list was requested to be written to the FI variable repository; and
the write engine is to write any data indicated in the commit list to the FI variable repository in the order specified in the commit list.

11. The system of claim 10, further comprising:
a failure engine to trigger the write engine to write any data indicated in the commit list to the FI variable repository, in response a failure condition of the computing device.

12. The system of claim 10, further comprising:
a failure engine to cause the write engine to write any data indicated in the commit list to the FI variable repository during a boot process of the computing device performed in response to a failure condition of the computing device.

13. A method comprising:
in response to a request to write target data to a firmware interface (FI) variable repository via system management mode (SMM), storing the target data in a variable repository cache of system management memory of a computing device during a given SMM event;
updating, during the given SMM event, a commit list to indicate that the target data is to be written to the FI variable repository, implemented in non-volatile memory of the computing device, wherein the commit list is stored in the system management memory;
scheduling, during the given SMM event, a supplemental SMM event; and
ending the given SMM event after the commit list is updated and without the target data being written to the FI variable repository during the given SMM event.

14. The method of claim 13, further comprising:
writing at least a portion of any data indicated in the commit list to the FI variable repository during the supplemental SMM event;
in response to a determination that the SMM time limit has been reached during the supplemental SMM event, updating the commit list to indicate any data indicated in the commit list before the supplemental SMM event that remains to be written to the FI variable repository after the supplemental SMM event; and in response to a determination that the commit list indicates that data remains to be written to the FI variable repository after the supplemental SMM event, scheduling another supplemental SMM event.

15. The method of claim 13, wherein the scheduling comprises:

configuring the computing device to periodically trigger subsequent SMM events, wherein one of the subsequent SMM events is the supplemental SMM event.

* * * * *